(No Model.)

G. NEWTON.
BEARING FOR BALANCE STAFFS OF TIMEPIECES.

No. 482,585. Patented Sept. 13, 1892.

WITNESSES:
W. R. Davis
C. Sedgwick

INVENTOR:
G. Newton
BY
Munn & Co.
ATTORNEYS

UNITED STATES PATENT OFFICE.

GEORGE NEWTON, OF NEW YORK, N. Y.

BEARING FOR BALANCE-STAFFS OF TIMEPIECES.

SPECIFICATION forming part of Letters Patent No. 482,585, dated September 13, 1892.

Application filed November 29, 1890. Serial No. 372,996. (No model.)

*To all whom it may concern:*

Be it known that I, GEORGE NEWTON, at present residing in the city, county, and State of New York, have invented a new and useful Improvement in Bearings for the Balance-Staffs of Watches or of Chronometers, of which the following is a full, clear, and exact description.

My invention relates to an improvement in the bearings for balance-staffs of watches or of chronometers, and has for its object to provide a means whereby the pivots of the balance-staffs and the jewels, stones, or bearings in which they work will be protected from breakage, bruises, or other injury when the watch or the chronometer may chance to meet with a severe fall, shock, or blow.

The invention consists in the novel construction and combination of the several parts, as will be hereinafter fully set forth, and pointed out in the claims.

Reference is to be had to the accompanying drawings, forming a part of this specification, in which similar letters of reference indicate corresponding parts in both the figures.

Figure 1:
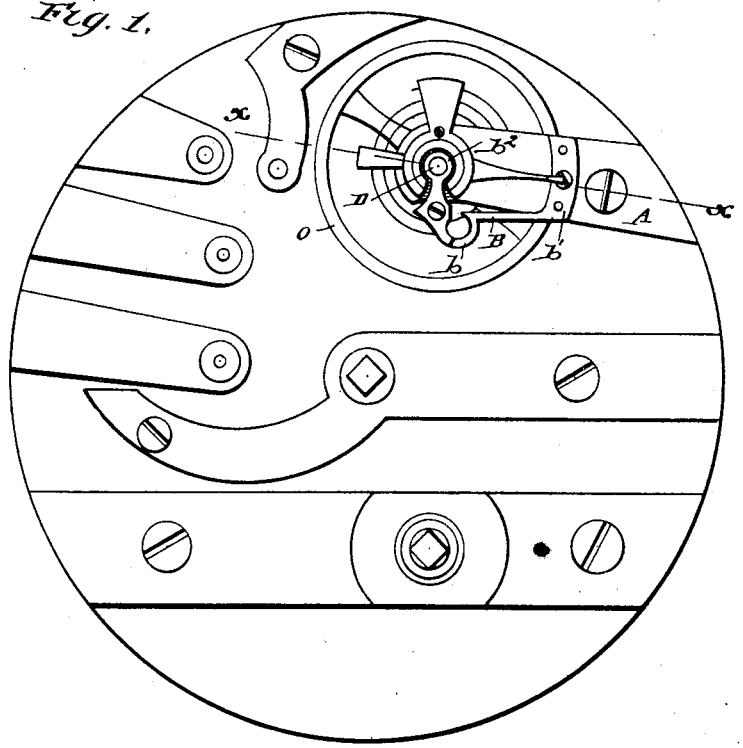
Figure 2:
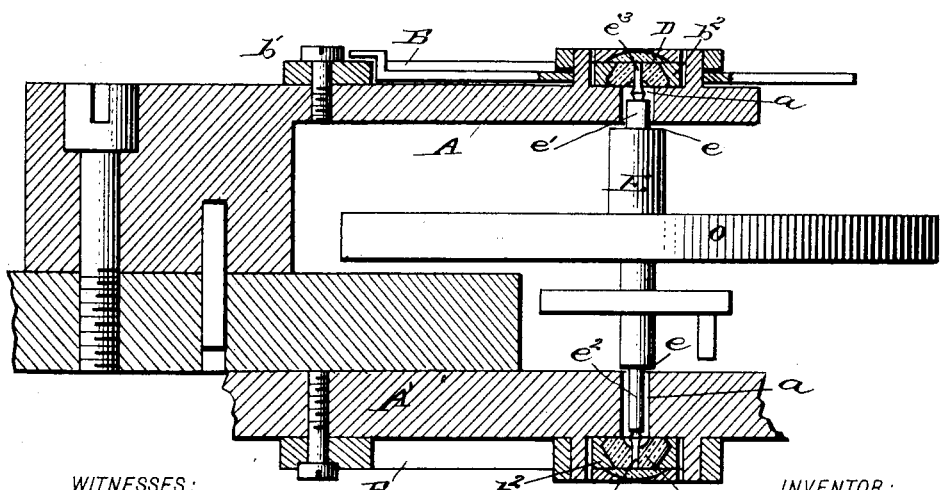

Referring to the drawings, Figure 1 is a plan view of a watch-movement having my improvement applied, and Fig. 2 is a transverse section on the line $x\ x$ of Fig. 1.

In referring to the watch-movement as a matter of convenience I will designate the face next to the dial as the lower side and the back as the upper side.

A represents the upper bridge, and A′ the lower bridge or support, in each of which bridges aligning apertures $a$ are produced, which apertures are circular, though they may be of any other form. Upon the outer surface of each bridge a spring B is secured, which springs are independent of one another, and may be spiral, curved, angular, or straight. Preferably, however, the springs are formed as illustrated in Fig. 1, in which from one end of a segmental body a plate $b'$ is projected, whereby the spring is secured to the bridge by means of a screw or equivalent fastening device.

Upon the opposite end of the body $b$ an integral or attached ring, bed, or band $b^2$ is formed and surrounded by the elevated flange, the body of the spring being so located upon the bridge that the center of the said band, bed, or ring will vertically align the center of the respective bridge-apertures. In the rings, beds, or bands $b^2$ the jewels, stones, or bearings D, adapted for the reception of the pivots of the balance-staffs, are secured or set in any approved or suitable manner, as is best illustrated in Fig. 2.

The balance-staff E, near each extremity, is provided with an angular shoulder $e$, whereby a reduced surface, herein called "spindles," $e'$ and $e^2$, is obtained, the said surfaces or spindles being of a length slightly greater than the thickness of the respective upper and lower bridges and of a diameter less than the diameter of the bridge-apertures $a$, through which they pass. The extremities of the balance-staff E are further reduced to form pivots $e^3$ and $e^4$, whereby the staff is journaled in the jewels, stones, or bearings D, located in the several springs B. The distance from the outer surface or periphery of said ring, bed, or band to the inner surface of said flange is equal to that from the surface of said spindle to the surface of said bridge-aperture. When the watch or chronometer is running, the staff-shoulder $e$ stands about one-half the pivot's length from the under and upper surfaces, respectively, of the upper and lower bridges or supports, as shown in Fig. 2, from which it will be seen that whenever the watch or chronometer receives a severe fall, shock, or blow from any direction the rings, beds, or bands in which the jewels, stones, or bearings are set, each being mounted in the end of the reciprocating spring, recede or give way, and the surface of the periphery of said ring, bed, or band comes in contact with the inner surface of said flange at the same time that the surface of said spindle comes in contact with the surface of said bridge-aperture, or that said shoulder $e$ of the balance-staff comes in contact with said bridge or both, whereby the body of the balance-staff, including the jewels, beds, or bands, is stayed, and the supports and the pivots or jewels are protected from injury.

I am aware that the combination of a spring with the jewel with the upper bridge only, which spring is attached to the bridge or support, is old and has been in use for many years on the old style "parachute and compensation watches," and also in the device of Walter Ware, patented February 16, 1884, No. 294,168, and in that of Henry Knickman, patented October 25, 1887, No. 372,269, but not in combination with the peculiar form of balance-staff which I employ, wherein the staff is so adjusted as to take the shock from its pivots by coming in contact with the bridges; and I therefore do not lay claim, broadly, to the application of a spring carrying a jewel to the bridge of a balance-staff of a watch-movement.

Having thus described my invention, I claim as new and desire to secure by Letters Patent—

1. The combination, with the ends of the balance-staff of a watch or of a chronometer, which balance-staff is provided with a pivot at each of its extremities journaled in jewels, stones, or bearings set in the free ends of reciprocating springs, the other ends of which springs are made fast to any desirable part of the watch or of the chronometer and having a surface or spindle upon the ends of said balance-staff adjoining and at the inner ends of said pivots, which spindles are of less diameter than the diameter of the bridge-apertures and of greater length than the thickness of the bridges and which balance-staff is at the inner terminus of said surfaces or spindles provided with shoulders the diameters of which are greater than the diameter of the bridge-apertures that surround said spindles adjoined to said shoulders between said shoulders and said pivots, of bridges provided with essentially-aligning apertures, which apertures are of slightly-greater diameter than the diameter of said spindles and the thickness of which bridges is slightly less than the length of said spindles, as and for the purpose set forth.

2. The combination, with the ends of the balance-staff of a watch or of a chronometer, which balance-staff is provided with a pivot at each of its extremities journaled in jewels, stones, or bearings set in the free ends of reciprocating springs, the other ends of which springs are made fast to any desirable part of the watch or the chronometer and having a surface or spindle upon the ends of said balance-staff adjoining and at the inner end of said pivots, which spindles are of less diameter than the diameter of the bridge-apertures and of greater length than the thickness of the bridges and which balance-staff is at the inner terminus of said surfaces or spindles provided with shoulders, the diameters of which shoulders are greater than the diameters of the bridge-apertures that surround said spindles adjoined to said shoulders between said shoulders and said pivots, of flanges surrounding the jewel-beds, bridges provided with essentially-aligning apertures, which apertures are of slightly-greater diameter than the diameter of said spindles and the thickness of which bridges is slightly less than the length of said spindles, the distance between the surfaces of said spindles and the inner surfaces of said apertures being practically equal to the distance between the jewel-beds and the inner surfaces of said flanges, substantially as described.

3. The combination, with the balance-bridge provided with an aperture to receive a balance-staff, a spring mounted upon the bridge containing the jewel-bed, and a flange surrounding the bed, of a balance-staff passing through the pivot-aperture in the bridge into the jewel of the bed, the space intervening the staff and the walls of the bridge-aperture being essentially the same as the distance intervening the periphery of the jewel-bed and the inner face of the flange, substantially as described.

4. The combination, with the balance-staff of a watch or chronometer, provided with a pivot at each of its ends and a reduced ortion (surface or spindle) between each of said pivots and the main body of said staff, and a shoulder on each end of said staff at the inner termini of said spindles, of a bridge at each end of said staff, each of which bridges is provided with an aperture through which one of said spindles passes, each of which apertures has a diameter sufficiently larger than said spindle, which passes through it, to permit said spindle to turn freely without touching the surface of said aperture unless when subjected to a severe strain and then to come in contact therewith, the inner surface of each of said bridges being sufficiently near to each of said shoulders at each of the extremities of the main body of said staff to come in contact therewith when said staff may receive a severe end-thrust, otherwise to permit said staff to run freely and without coming in contact with either of said bridges and the distance between the surface of each of said spindles and the surface of each of said apertures being practically equal to the distance between the periphery or edge of each of said jewel-beds and the inner surface of the flange or elevation which surrounds or nearly circumvents it, substantially as set forth.

GEORGE NEWTON.

Witnesses:
 E. M. CLARK,
 C. SEDGWICK.